United States Patent
Blivet (10) Patent No.: US 10,975,995 B2
(45) Date of Patent: Apr. 13, 2021

(54) BAYONET CONNECTION FOR COUPLING BODIES

(71) Applicant: NORMA Autoline France SAS, Guichen (FR)

(72) Inventor: Philippe Blivet, Rennes (FR)

(73) Assignee: NORMA Autoline France SAS, Guichen (FR)

( * ) Notice: Subject to any disclaimer, the term of this patent is extended or adjusted under 35 U.S.C. 154(b) by 202 days.

(21) Appl. No.: 15/487,482

(22) Filed: Apr. 14, 2017

(65) Prior Publication Data

US 2018/0066780 A1 Mar. 8, 2018

Related U.S. Application Data

(63) Continuation of application No. 13/027,334, filed on Feb. 15, 2011, now abandoned, which is a continuation of application No. PCT/FR2009/001018, filed on Aug. 30, 2009.

(30) Foreign Application Priority Data

Aug. 30, 2008 (FR) ...................................... 0804650

(51) Int. Cl.
  *F16L 37/252* (2006.01)
  *F16L 37/248* (2006.01)
  *F16L 37/084* (2006.01)

(52) U.S. Cl.
  CPC ......... *F16L 37/248* (2013.01); *F16L 37/0841* (2013.01); *F16L 37/252* (2013.01)

(58) Field of Classification Search
  CPC ..... F16L 37/248; F16L 37/252; F16L 37/0841
  USPC ................ 285/402, 401, 376, 308, 317, 305
  See application file for complete search history.

(56) References Cited

U.S. PATENT DOCUMENTS

| 628,765 A | 7/1899 | Collette |
| 708,171 A | 9/1902 | Reubelt |
| 1,274,406 A | 8/1918 | Frazier |
| 2,248,701 A | 7/1941 | Fowler |
| 4,449,737 A | 5/1984 | Specht |
| 4,758,023 A | 7/1988 | Vermillion |

(Continued)

FOREIGN PATENT DOCUMENTS

| CH | 405839 A | 1/1966 |
| GB | 2223814 A | 4/1990 |

*Primary Examiner* — David Bochna
(74) *Attorney, Agent, or Firm* — Harness, Dickey & Pierce, P.L.C.

(57) ABSTRACT

Fluid coupling formed as an assembly of a first body section having an end portion with studs and a second body section having an end portion configured to receive the end portion of the first body section and having grooves for receiving a corresponding one of the studs. Each of the grooves has an axial inlet section, and a blind section extending circumferentially from the inlet section to an end wall movable between a projecting position retaining the stud in the blind section and a retracted position allowing the stud to pass from the inlet to the blind section. Rotation of one of the body sections passes the studs in the retracted position of the groove end wall from the inlet section into the blind section, the studs being retained in the blind section in the projected position of the groove end wall to couple the body sections.

18 Claims, 3 Drawing Sheets

(56) References Cited

U.S. PATENT DOCUMENTS

| | | |
|---|---|---|
| 5,397,196 A | 3/1995 | Boiret et al. |
| 5,741,084 A | 4/1998 | Del Rio et al. |
| 5,931,510 A | 8/1999 | Mathew et al. |
| 6,206,433 B1 | 3/2001 | Bloomer |
| 6,318,764 B1 | 11/2001 | Trede et al. |
| 6,422,205 B2 | 7/2002 | Wynn, Jr. et al. |
| 6,557,903 B2 | 5/2003 | Walker |
| 6,595,556 B1 | 7/2003 | Zenko et al. |
| 6,925,686 B2 * | 8/2005 | Heathcock ............... B25G 1/04 15/144.4 |
| 8,104,799 B2 | 1/2012 | Huskamp et al. |
| 8,157,296 B2 | 4/2012 | Ullrich et al. |
| 2003/0178844 A1 | 9/2003 | Klinger et al. |
| 2008/0093846 A1 | 4/2008 | Sparks et al. |
| 2011/0148107 A1 | 6/2011 | Blivet |

* cited by examiner

BAYONET CONNECTION FOR COUPLING BODIES

CROSS REFERENCE TO RELATED APPLICATIONS

This application is a continuation of U.S. patent application Ser. No. 13/027,334, filed on Feb. 15, 2011, which is a continuation of co-pending International Application No. PCT/FR2009/001018 filed Aug. 20, 2009, which designated the United States, and which claims priority to French Patent Application No. 0804650, filed Aug. 20, 2008, the disclosure of each of which is expressly incorporated herein by reference.

BACKGROUND OF THE INVENTION

The present invention relates to a coupling suitable for use in connecting together two ducts, e.g. for connecting together pipes or for connecting a pipe to a fluid emitter or receiver member such as a pump, a manifold, an actuator, a flow or pressure regulator, a tank. The invention also provides a body part for such a coupling and a method of reinforcing a bayonet connection securing the two body parts of a coupling together.

Couplings are known that comprise a body defining an internal channel and comprising two body parts, each provided with connector means for connecting the channel to a duct. The connector means may be of various types, e.g. comprising a male tubular section with Christmas-tree teeth or forming a nipple that is to be engaged by force in the duct, or a female tubular section provided with a toothed washer or with a quick coupling clamp for engaging the duct. The body is generally made as a one-piece molding, but that prevents any modularity of the coupling for the purpose of simplifying fabrication. It is necessary to provide a plurality of different molds for fabricating bodies that associate the various types of connector that are in use.

Couplings are also known in which the body is made up of two independent parts. The body parts then have end portions arranged to enable the first and second body parts to be secured to each other by relative engagement. The end portions have means for mutual retention such as snap-fastener means or clip-fastener means acting in an axial engagement direction. Unfortunately, most of the forces that act externally on such a coupling include an axial component. That means that the strength of the connection between the body parts is relatively weak.

SUMMARY OF THE INVENTION

An aspect of the invention is to provide an alternative to conventional techniques for connecting the body parts of a coupling together. To this end, the invention provides a coupling comprising a tubular body defining an internal channel and comprising a first body part and a second body part, each provided with connector means for connecting the channel to a duct, the first and second body parts having end portions arranged to enable the first and second body parts to be secured to each other by relative engagement, wherein the end portions are provided with fastener elements arranged to define an irreversible bayonet connection, the end portion of the first part including at least one radially projecting stud and the end portion of the second part including at least one groove for receiving the stud, the groove having an inlet segment opening out into a blind segment that extends in a substantially circumferential direction of the coupling, the groove having a wall element that is movable between a retracted position outside the groove so as to allow the stud to pass from the inlet segment to the blind segment, and a projecting position inside the groove so as to prevent the stud from escaping from the blind segment, the coupling including holder means for holding the wall element in its projecting position.

The fastener elements that define a bayonet connection co-operate with each other via bearing surfaces that are strong in the axial direction, thereby conferring relatively great strength to the coupling against forces exerted in that direction. In addition, the fastener elements also oppose disengagement of the body parts in the event of them pivoting relative to each other by ensuring that the bayonet connection is irreversible.

The movable wall element constitutes a simple manner of ensuring that the bayonet connection is irreversible.

Advantageously, the holder means comprise resilient return means for urging the wall element into its projecting position and, preferably, the wall element is elastically deformable from its projecting position towards its retracted position.

The passage from the retracted position to the projecting position is thus instantaneous. In addition, the use of an elastically deformable wall element makes it possible to provide irreversibility and resilient return without having recourse to fitting separate elements, thereby limiting assembly costs and making it possible to retain a coupling that is relatively lightweight.

Advantageously, the end portion of the first part is a male part and the stud extends radially, projecting outwards from the end portion, and the end portion of the second part includes a wall defining a housing for receiving the first part, the groove being formed in said wall of the housing, the inlet segment extending in a substantially axial direction of the housing and having one end opening out into a terminal face of the second part and an opposite end opening out into the blind segment and, preferably, the groove has an end wall forming the movable wall element, the end wall being elastically deformable from its projecting position towards its retracted position.

In this embodiment, the coupling is easy to make.

Also preferably, the end wall forming the movable wall element possesses a stationary end in the inlet segment and a free end close to the blind segment and, advantageously, the stud and the free end of the end wall forming the movable wall element are of complementary shapes arranged in such a manner that a force from the stud on the free end towards the inlet segment tends to hold the end wall forming the movable wall element in the projecting position.

If the stud is pressed against the free end of the movable wall element, it tends to hold it in its projecting position.

Also advantageously, the end portions comprise respectively a plurality of studs and a plurality of grooves, said studs and grooves being arranged symmetrically so as to allow a plurality of angular positions for mutual engagement of the body parts.

This is particularly advantageous when one of the two body parts is not symmetrical, e.g. when it has a bend, which bend can then be oriented in different directions so as to make it easier to install the coupling in a circuit by adapting its shape to its surroundings.

The invention also provides a body part for such a coupling. This body part has an end portion with at least one groove for receiving a stud, the groove having an inlet segment opening into a blind segment that is at an angle relative thereto, and a wall element that is movable between a retracted position outside the groove so as to allow the stud to pass from the inlet segment to the blind segment, and a projecting position inside the groove so as to prevent the stud from escaping from the blind segment, the coupling including holder means for holding the wall element in the projecting position.

The invention also provides a method of reinforcing the connection between two body parts of a tubular body of a coupling, the body defining an internal channel and each of the body parts being provided with means for connecting the channel to a duct and each having a respective end portion arranged to enable the first and second body parts to be secured to each other by relative engagement, the end portions being provided with fastener elements comprising respectively at least one radially projecting stud and at least one groove for receiving the stud, the groove including an inlet segment opening into a blind segment extending in a substantially circumferential direction of the coupling, the method comprising the step of plastically deforming at least one of the fastener elements in order to block the stud in the blind segment.

The method of the invention thus makes it possible to ensure that the bayonet connection securing the body parts together is irreversible.

According to a particular characteristic, the groove includes a wall element that is movable between a retracted position outside the groove for allowing the stud to pass from the inlet segment to the blind segment and a projecting position inside the groove to prevent the stud from escaping from the blind segment, the deformation being performed to oppose movement of the movable wall element from its projecting position towards its retracted position, against the movable wall element, or against the stud.

The function of the plastic deformation is to increase resistance to the stud moving towards the inlet segment of the groove by acting on the stud itself or by acting on the movable wall element.

Other characteristics and advantages of the invention appear on reading the following description of particular non-limiting embodiments of the invention.

Other characteristics and advantages of the invention appear on reading the following description of particular, non-limiting embodiments of the invention.

The present invention, accordingly, comprises the construction, combination of elements, and/or arrangement of parts and steps which are exemplified in the detailed disclosure to follow.

BRIEF DESCRIPTION OF THE DRAWINGS

Reference is made to the accompanying drawings, in which.

The drawings will be described further in connection with the following Detailed Description of the Invention.

DETAILED DESCRIPTION OF THE INVENTION

With reference to FIGS. 1 to 4, the coupling in accordance with the invention comprises a body given overall reference 1 that is tubular, defining an internal channel 2 and that is arranged to connect the internal channel 2 to two ducts, e.g., belonging to fluid circuit members such as pipes, a manifold, an actuator, or a tank.

Figure 1:
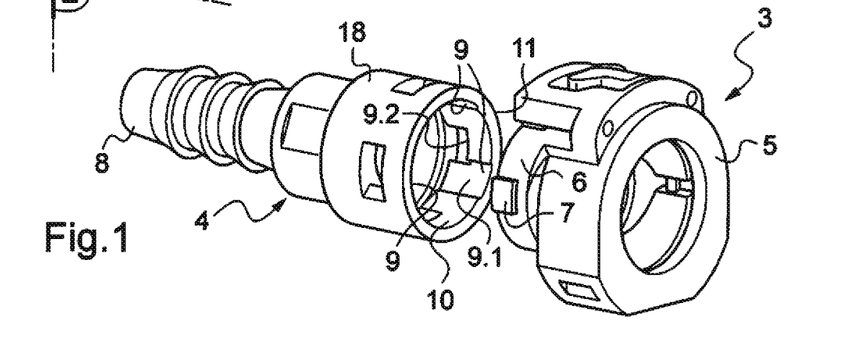
FIG. 1 is a partially exploded perspective view of a coupling in accordance with the invention.
Figure 2:
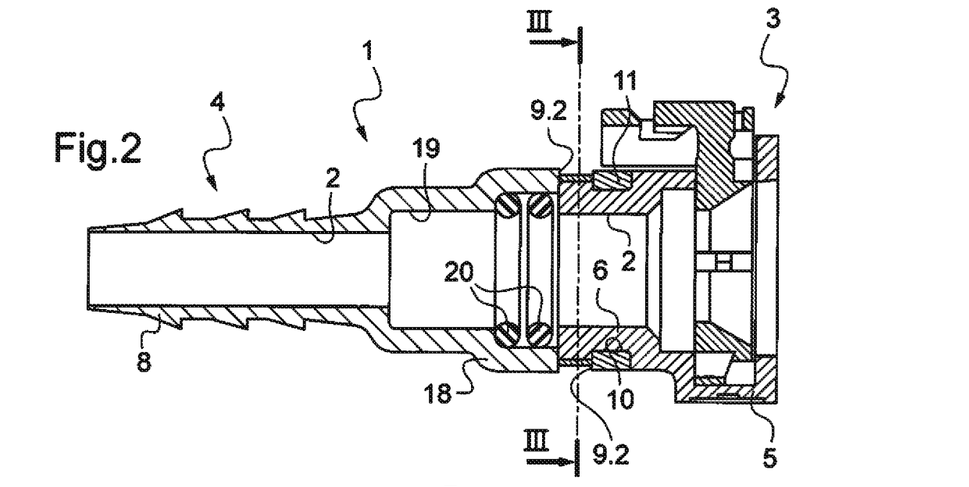
FIG. 2 is a view of the coupling in longitudinal section on plane II of FIG. 1.

The body 1 has a fust body part and a second body part that are given respective overall references 3 and 4. The first body part 3 and the second body part 4 thus define respective segments of the internal channel 2.

The first body part 3 possesses a first end portion 5 arranged as a female connector portion for connection to one end of one of the ducts in order to connect said duct to the internal channel 2, and a second end portion 6 arranged as a male link portion for linking to the second body part. The end portion 5 includes a chamber arranged at one end of the internal channel 2 and provided with conventional connector means, here comprising a latch that is movable radially to co-operate with a portion in relief on the outside of the duct. The end portion 6 is provided with four studs 7 projecting radially outwards and arranged symmetrically at 90° from one another.

Figure 3:
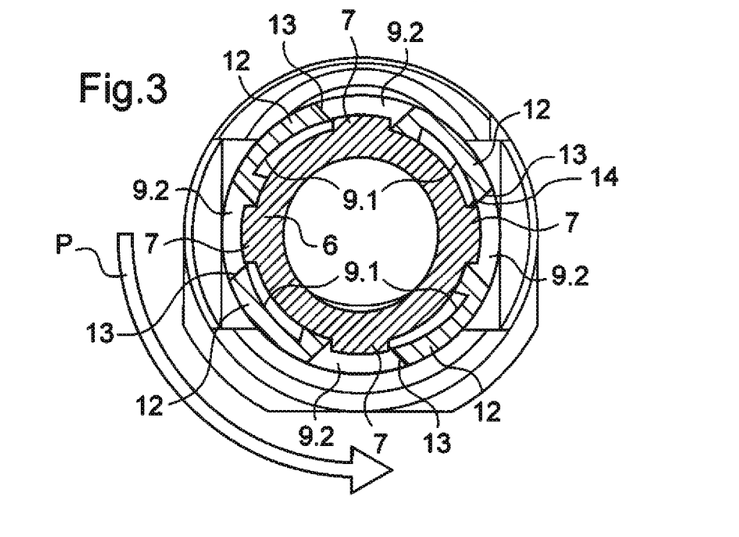
FIG. 3 is a view of the coupling in cross-section on line III-III of FIG. 2.

The second body part 4 possesses a first end portion 8 arranged as a connector portion for connection to one end of the other one of the ducts to connect said duct to the internal channel 2, and a second end portion 18 arranged as a female link portion for linking to the first body part 3. The end portion 8 is provided with connector means, in this example with outwardly-projecting Christmas-tree serrations, i.e. barbs, and it is arranged to be engaged by force in said end of said duct. The end portion 18 is provided with a bore 19 of diameter that is greater than the diameter of the internal channel 2 (the diameter of the bore 19 is equal to the outside diameter of the duct), and having an end opposite from the end portion 8 that is provided with a chamber 10 for receiving the end portion 6. From beside the end portion 8, the bore 19 receives sealing elements 20 for clamping onto the end of the duct that is retained by the connector means of the body part 3. The chamber 10 is provided internally with four grooves 9 disposed symmetrically at 90° from one another for slidably receiving the studs 7. Each groove 9 includes an inlet segment 9.1 extending axially, having one end opening out into a terminal face 11 of the end portion 8, and an opposite end opening out into a blind segment 9.2 that extends in a circumferential direction of the chamber 10. Each groove 9 possesses an end wall element 12 having one end secured to the chamber wall 10 and an opposite free end 13. The end wall element 12 extends in the inlet segment 9.1 in a circumferential direction of the chamber 10 so as to have its free end 13 extending to the inlet to the blind segment 9.2. The end wall element 12 is elastically deformable between a rest state in which the free end 13 projects inside the groove 9 to oppose exit of the stud 7 from the blind segment 9.2, and a deformed state in which the free end 13 is retracted outside the groove 9 so as to allow the stud 7 to pass from the inlet segment 9.1 to the blind segment 9.2. The end wall element 12 thus forms a movable wall element.

Assembly of the coupling amounts to engaging the end portion 6 axially in the chamber 10 by engaging the studs 7 in the inlet segments 9.1 of the grooves 9 (FIG. 4) and then causing the first part 3 to pivot relative to the second part 4 (in the direction of arrow P in FIG. 3) so as to cause the studs 7 to penetrate into the blind segments 9.2. On the studs 7 passing from the inlet segment 9.1 to the blind segment 9.2, the studs 7 deform the end wall elements 12 from their rest state to their deformed state. After the studs 7 have gone past, each end wall element 12 returns automatically to its rest state as a result of its own resilience. The free ends 13 of the end wall elements 12 are then in the vicinity of side faces 14 of the studs 7, opposing any movement of the studs towards the inlet segments 9.1 (FIG. 3).

It should be observed that the studs 7 are of a width equal to the distance between the end 13 and a terminal wall of the blind segment 9.2, such that each stud 7 is received with practically no slack in the blind segment 9.2.

Figures 4, 5, 6:
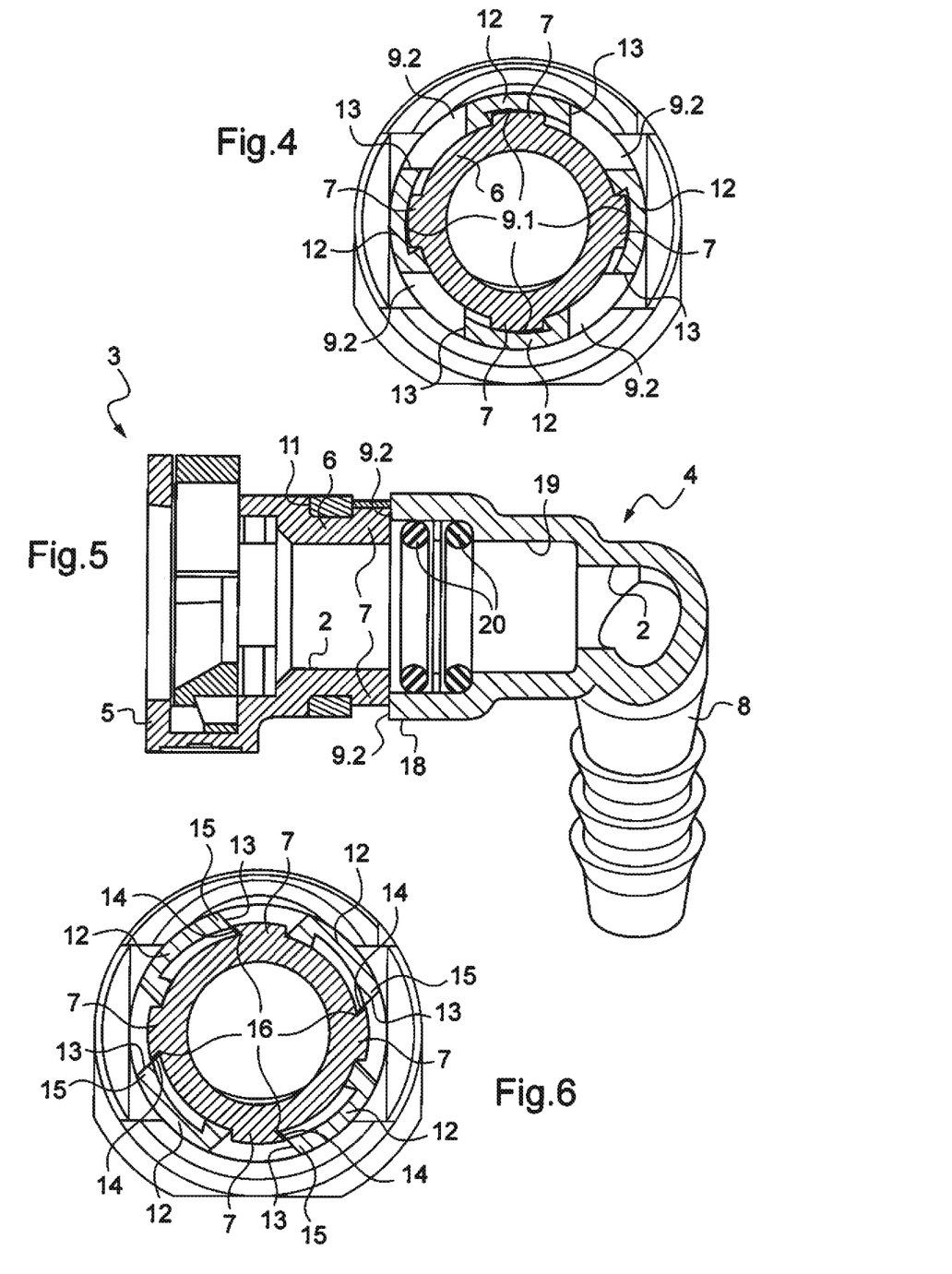
FIG. 4 is a view analogous to FIG. 3 during assembly of the coupling, during relative engagement of the two body parts.
FIG. 5 is a view analogous to FIG. 2 of a coupling in a first variant embodiment, one of its body parts having a bend.
FIG. 6 is a view analogous to FIG. 2 of a coupling constituting a second variant embodiment, the fastener elements co-operating in reinforced manner to increase the strength of the bayonet connection.

In the variant of FIG. 5, the second body part 4 has a bend so that the male end portion 8 is at an angle of 90° relative to the end portion 18.

It can be understood that the symmetrical arrangement of the studs 7 and the grooves 9 at 90° allows for four possible orientations of the body parts relative to each other, thus making it possible to select the orientation of the latch of the first body part 3 relative to the male end portion 8 of the second body part 4 in such a manner as to facilitate access to the latch as a function of the environment of the coupling.

In the variant of FIG. 6, the end 13 of each end wall element 12 and the face 14 of each stud 7 are of shapes that are complementary so as to oppose movement of the end 13 towards its retracted position. In this example, the end 13 has a chamfered portion 15 that penetrates into a setback 16 in the face 14 at the base of the stud 7 so that when the face 14 exerts a force on the end 13, co-operation between the chamfered portion 15 and the setback 16 tending to hold the end wall element 12 in its rest state.

Figures 7, 8:
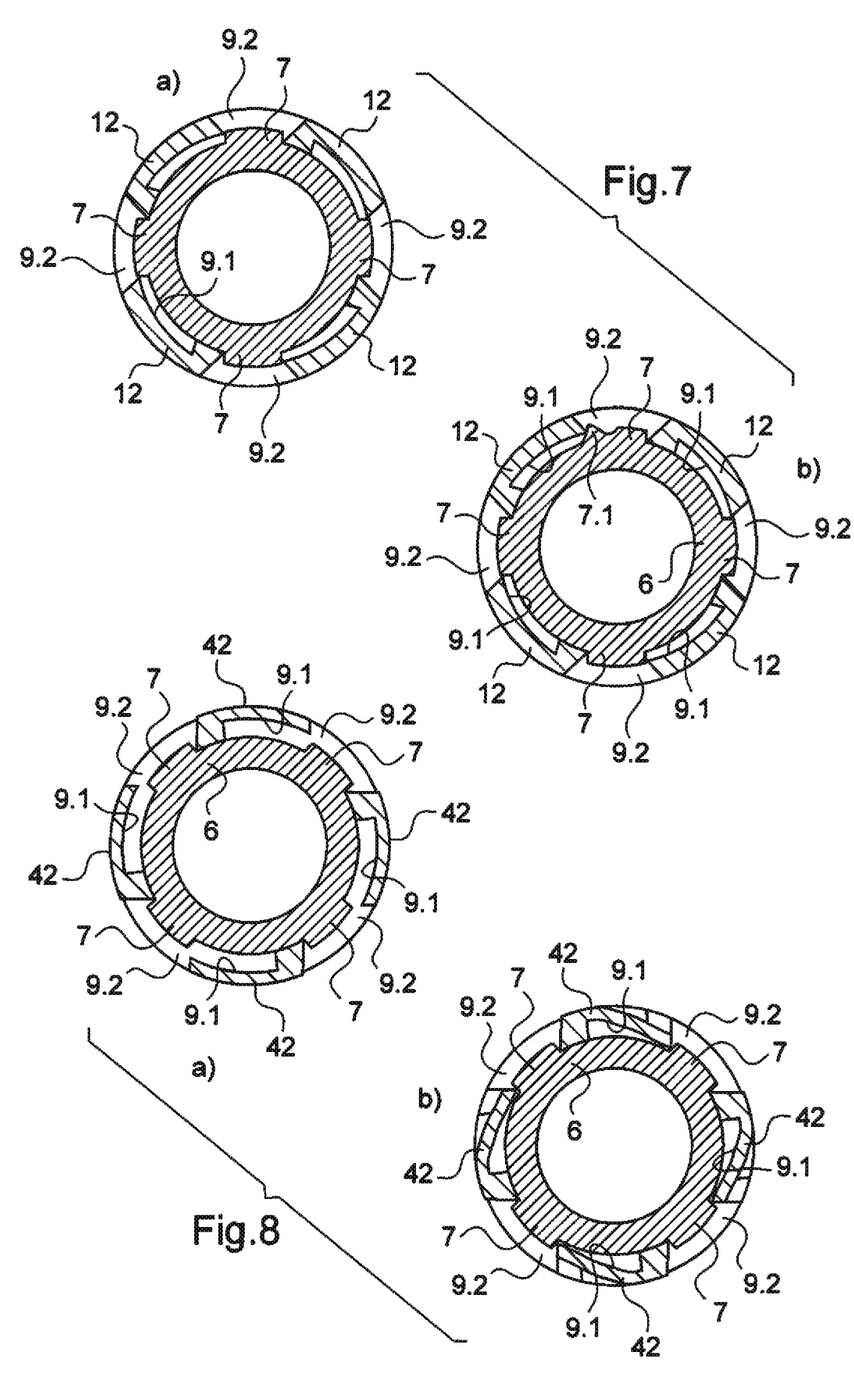
FIG. 7 is a section view analogous to FIG. 3 showing a first implementation of the method of the invention.
FIG. 8 is a view analogous to FIG. 7 showing a second implementation of the method of the invention.

FIG. 7 shows a coupling analogous to that shown in FIGS. 1 to 4 and that has been subjected to the method of the invention in a first implementation. In this implementation, at least one of the studs 7 is subjected to hot deformation 7.1 so as to increase locally the height of the stud 7 at the face 14 and prevent the stud 7 from escaping from the thrust of the end 13 (FIG. 7.a shows the coupling before deformation; FIG. 7.b shows the coupling after deformation).

FIG. 8 shows a coupling analogous to that shown in FIGS. 1 to 4 except in that the grooves 9 do not have a movable end wall element (see FIG. 8.a). The structure of the coupling thus does not ensure that the bayonet connection is irreversible. This coupling has therefore been subjected to the method of the invention in its second implementation. In this implementation, the end wall 42 of at least one of the grooves 9 at the inlet of the blind segment 9.2 is subjected to local hot deformation so as to reduce locally the height of the groove 9 so that the stud 7 is taller than the groove 9 at this location and comes into abutment against the deformed portion of the end wall. This prevents the stud 7 from moving out from the blind segment 9.2 of the groove 9. In this example the hot deformation prevents the stud 7 from moving out from the blind segment 9.2 of the groove 9 by eliminating assembly clearances.

The hot deformation may be performed by a laser beam or by a hot punch. The deformation could also be performed cold.

Naturally, the invention is not limited to the embodiments described but covers any variant coming within the ambit of the invention as defined by the claims.

In particular, the bayonet connection may be made irreversible by means other than those described, and for example by means of a latch mounted on the body part having the groove so as to be movable transversely in the groove.

Although in the embodiments described, the end wall element 12 forms the movable wall element, the movable wall element could be constituted by a portion of one of the flanks of the groove. The movable wall element could be hinged to the chamber and urged resiliently into a projecting position by an independent spring or it could be held mechanically in its projecting position.

The plastic deformation may be obtained on any part of the coupling, providing it is sufficient to ensure that the bayonet connection is irreversible.

Other connector means can be used, and in particular: quick coupling means, non-quick coupling means, forced engagement means, clip-fastener means, a toothed washer, a retention clamp. The coupling may have two male ends or two female ends.

The number and the positioning of the studs and of the grooves may be modified, for example as a function of the number of potential angular orientations that it is desired to have between the body parts.

The link between the first body part and the second body part may be provided as described herein upstream from the sealing elements 20 (upstream relative to the direction in which the duct end is inserted in the chamber of the first end portion) or downstream from said sealing elements, however it is then necessary to provide additional sealing elements between the first body part and the second body part.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A coupling for connecting a first component in fluid communication with a second component, the coupling comprising a generally tubular body having an internal channel enabling fluid passage, the body comprising:

a generally tubular first body section extending axially between a first end portion couplable to the first component for connecting the first component in fluid communication with the body channel, and a second end portion, the first body section having a first channel section extending axially therethrough from the first end portion to the second end portion;

a generally tubular second body section extending axially between a first end portion couplable to the second component for connecting the second component in fluid communication with the body channel, and a second end portion configured to receive the second end portion of the first body section coaxially therein, the second body section having a second channel section extending axially therethrough from the first end portion to the second end portion, the first channel section and the second channel section defining the tubular body internal channel;

wherein one of the first body section second end portion and the second body section second end portion includes at least one radially projecting stud;

wherein the other one of the first body section second end portion and the second body section second end portion includes at least one groove for receiving the stud, the groove having an inlet section extending from the corresponding body section second end portion, and a blind section extending circumferentially from the inlet section to an end wall movable between a projecting position retaining the stud in the blind section and a retracted position allowing the stud to pass from the inlet section to the blind section;

whereby with the second end portion of the first body section being received coaxially in the second end portion of the second body section with the stud being received in the inlet section of the groove, one of the first and the second body section is rotatable relative to the other body section to pass the stud in the retracted position of the groove end wall from the groove inlet section into the groove blind section, the stud being retained in the groove blind section in the projected position of the groove end wall to permanently couple the first body section to the second body section to form the body with the internal channel defined by the first channel section of the first body section and the second channel section of the second body section; and the end wall is resiliently deformed from its projected position to its retracted position by the bearing of the stud, as the stud is passed from the groove inlet section to the groove blind section, the end wall automatically returns to a rest state where the free end of the end wall is out of contact with the stud in a circumferential direction and the free end of the end wall has a chamfered portion that penetrates into a setback in a face at the base of the stud to block the stud in the blind section prohibiting removal of the stud from the blind section so that the connection securing the first and second body sections together is irreversible.

2. The coupling of claim 1, wherein the end wall has a moveable end adjacent the groove inlet segment and a stationary end adjacent the groove blind segment.

3. The coupling of claim 2, wherein the stud has a first shape and the moveable end of the end wall has a second shaped complementary to the first shape such that as retained in the groove blind section the stud is engagable with the moveable end of the end wall such that the end wall is urged towards its projecting position.

4. The coupling of claim 1, wherein the stud has a first shape and the end wall has a second shaped complementary to the first shape such that as retained in the groove blind section, the stud is engagable with the end wall such that the end wall is urged towards its projecting position.

5. The coupling of claim 1, wherein:
the second end portion of the first body section has a first said stud and at least a second said stud; and
the second end portion of the second body section has a first said groove and at least a second said groove;
the studs and grooves being arranged symmetrically so as to allow the second end portion of the first body section to be received coaxially in the second end portion of the second body section in a plurality of different angular orientations.

6. The coupling of claim 1, wherein:
the groove has a terminal wall; and
the groove end wall is dimensioned such that the stud in the projecting position of the end wall is held by the end wall against the terminal wall.

7. A first body part of a coupling for connecting a first component in fluid communication with a second component, the coupling comprising a generally tubular body having an internal channel enabling fluid passage, the body comprising the first body part and a second body part comprising a generally tubular first body section extending axially between a first end portion couplable to the first component for connecting the first component in fluid communication with the body channel, and a second end portion having a circumferential outer surface, the first body section having a first channel section extending axially therethrough from the first end portion to the second end portion, the first body part comprising:

a generally tubular second body section extending axially between a first end portion couplable to the second component for connecting the second component in fluid communication with the body channel, and a second end portion configured to receive the second end portion of the first body section coaxially therein;

the second body section having a second channel section extending axially therethrough from the first end portion to the second end portion, the first channel section and the second channel section defining the tubular body internal channel;

wherein one of the first body section second end portion and the second body section second end portion includes at least one radially projecting stud;

wherein the other one of the first body section second end portion and the second body section second end portion includes at least one groove defined therein for receiving the stud, each of the grooves having an inlet section extending from the corresponding body section second end portion, and a blind section extending circumferentially from the inlet section to an end wall movable between a projecting position retaining the stud in the blind section and a retracted position allowing the stud to pass from the inlet section to the blind section; and whereby with the second end portion of the first body section being received coaxially in the second end portion of the second body section with the stud being received in the inlet section of the groove, one of the first and the second body section is rotatable relative to the other body section to pass the stud in the retracted position of the groove end wall from the groove inlet section into the groove blind section, the stud being retained in the groove blind section in the projected position of the corresponding groove end wall to permanently couple the first body second to the section body section to form the body with the internal channel defined by the first channel section of the first body section and the second channel section of the second body section; and the end wall is resiliently deformed from its projected position to its retracted position by the bearing of the stud as the stud is passed from the groove inlet section to the groove blind section, the end wall automatically returns to a rest state where the free end of the end wall is out of contact with the stud in a circumferential direction and the free end of the end wall has a chamfered portion that penetrates into a setback in a face at the base of the stud to block the stud in the blind section prohibiting removal of the stud from the blind section so that the connection securing the first and second body sections together is irreversible.

8. The first body part of claim 7, wherein the end wall has a moveable end adjacent the groove inlet segment and a stationary end adjacent the groove blind segment.

9. The first body part of claim 8, wherein the stud has a first shape and the moveable end of the end wall has a second shaped complementary to the first shape such that as retained in the groove blind section the stud is engagable with the moveable end of the end wall such that the end wall is urged towards its projecting position.

10. The first body part of claim 7, wherein the stud has a first shape and the moveable end of the end wall has a second shaped complementary to the first shape such that as retained in the groove blind section the stud is engagable with the moveable end of the end wall such that the end wall is urged towards its projecting position.

11. The first body part of claim 7, wherein:
the second end portion of the first body section has a first said stud and at least a second said stud; and
the second end portion of the second body section has a first said groove and at least a second said groove;
the studs and grooves being arranged symmetrically so as to allow the second end portion of the first body section to be received coaxially in the second end portion of the second body section in a plurality of different angular orientations.

12. The first body part of claim 7, wherein:
the groove has a terminal wall; and
the groove end wall is dimensioned such that the stud in the projecting position of the end wall is held by the end wall against the terminal wall.

13. A method of making a coupling for connecting a first component in fluid communication with a second component, the coupling comprising a generally tubular body having an internal channel enabling fluid passage, and the method comprises the steps of:
(a) providing a generally tubular first body section extending axially between a first end portion couplable to the first component for connecting the first component in fluid communication with the body channel, and a second end portion, the first body section having a first channel section extending axially therethrough from the first end portion to the second end portion;
(b) providing a generally tubular second body section extending axially between a first end portion couplable to the second component for connecting the second component in fluid communication with the body channel, and a second end portion configured to receive the second end portion of the first body section coaxially therein, the second body section having a second channel section extending axially therethrough from the first end portion to the second end portion, the first channel section and the second channel section defining the tubular body internal channel;
wherein one of the first body section second end portion and the second body section second end portion includes at least one radially projecting stud;
wherein the other one of the first body section second end portion and the second body section second end portion includes at least one groove for receiving the stud, the groove having an inlet section extending from the corresponding body section second end portion, and a blind section extending circumferentially from the inlet section to an end wall movable between a projecting position retaining the stud in the blind section and a retracted position allowing the stud to pass from the inlet section to the blind section;

(c) receiving the second end portion of the first body section in the second end portion of the second body section with the stud being received in the inlet section of the groove; and
(d) rotating one of the first and the second body section relative to the other body section to pass the stud in the retracted position of the groove end wall from the groove inlet section into the groove blind section, the stud being retained in the groove blind section in the projected position of the groove end wall to permanently couple the first body section to the second body section to form the body with the internal channel defined by the first channel section of the first body section and the second channel section of the second body section; and
the end wall is resiliently deformed in step (d) from its projected position to its retracted position by the bearing of the stud as the stud is passed from the groove inlet section to the groove blind section, the end wall automatically returns to a rest state where the free end of the end wall is out of contact with the stud in a circumferential direction and the free end of the end wall has a chamfered portion that penetrates into a setback in a face at the base of the stud to block the stud in the blind section prohibiting removal of the stud from the blind section so that the connection securing the first and second body sections together is irreversible.

14. The method of claim 13, wherein the end wall has a moveable end adjacent the groove inlet segment and a stationary end adjacent the groove blind segment.

15. The method of claim 14, wherein the stud has a first shape and the moveable end of the end wall has a second shaped complementary to the first shape such that as retained in step (d) in a corresponding groove blind section the stud is engagable with the moveable end of the end wall such that the end wall is urged towards its projecting position.

16. The method of claim 13, wherein the stud has a first shape and the end wall of the second body section has a second shaped complementary to the first shape such that as retained in step (d) in the groove blind section the stud is engagable with the end wall such that the end wall is urged towards its projecting position.

17. The method of claim 13, wherein:
the second end portion of the first body section has a first said stud and at least a second said stud; and
the second end portion of the second body section provided in step (b) has a first said groove and at least a second said groove;
the studs and grooves being arranged symmetrically so as to allow the second end portion of the first body section to be received in step (c) coaxially in the second end portion of the second body section in a plurality of different angular orientations.

18. The method of claim 13 wherein:
the groove has a terminal wall; and
the groove end wall is dimensioned such that in step (d) the stud in the projecting position of the end wall is held by the end wall against the terminal wall.

* * * * *

UNITED STATES PATENT AND TRADEMARK OFFICE
CERTIFICATE OF CORRECTION

PATENT NO. : 10,975,995 B2
APPLICATION NO. : 15/487482
DATED : April 13, 2021
INVENTOR(S) : Philippe Blivet Page 1 of 1

It is certified that error appears in the above-identified patent and that said Letters Patent is hereby corrected as shown below:

In the Specification

Column 4
Line 17    "fust" should be --first--

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*